(12) United States Patent
Miller et al.

(10) Patent No.: US 8,057,782 B2
(45) Date of Patent: Nov. 15, 2011

(54) PREPARATION OF SMALL PORE MOLECULAR SIEVES

(75) Inventors: Stephen J. Miller, San Francisco, CA (US); Lun-teh Yuen, Orinda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 873 days.

(21) Appl. No.: 11/862,989

(22) Filed: Sep. 27, 2007

(65) Prior Publication Data

US 2008/0159952 A1 Jul. 3, 2008

Related U.S. Application Data

(60) Provisional application No. 60/882,056, filed on Dec. 27, 2006.

(51) Int. Cl.
*C01B 39/04* (2006.01)
*C01B 37/00* (2006.01)

(52) U.S. Cl. ......................... 423/702; 423/706; 423/709

(58) Field of Classification Search .................. 423/702, 423/704, 706
See application file for complete search history.

(56) References Cited

U.S. PATENT DOCUMENTS

| 3,140,249 | A | | 7/1964 | Plank et al. | |
|---|---|---|---|---|---|
| 3,140,251 | A | | 7/1964 | Plank et al. | |
| 3,140,253 | A | | 7/1964 | Plank et al. | |
| 3,699,139 | A | * | 10/1972 | Rubin et al. | 556/173 |
| 4,481,173 | A | * | 11/1984 | Chu | 423/703 |
| 4,544,538 | A | * | 10/1985 | Zones | 423/706 |
| 5,057,296 | A | * | 10/1991 | Beck | 423/277 |
| 5,316,753 | A | | 5/1994 | Nakagawa | |
| 5,558,851 | A | * | 9/1996 | Miller | 423/702 |
| 5,653,956 | A | | 8/1997 | Zones | |
| 5,707,600 | A | | 1/1998 | Nakagawa et al. | |
| 5,707,601 | A | | 1/1998 | Nakagawa et al. | |
| 5,783,167 | A | * | 7/1998 | Corma Canos et al. | 423/701 |
| 5,785,947 | A | | 7/1998 | Zones et al. | |
| 7,022,308 | B1 | | 4/2006 | Yuen et al. | |
| 7,597,874 | B1 | * | 10/2009 | Miller et al. | 423/706 |
| 2002/0146367 | A1 | | 10/2002 | Miller et al. | |
| 2005/0139066 | A1 | | 6/2005 | Miller et al. | |

* cited by examiner

*Primary Examiner* — David M Brunsman
(74) *Attorney, Agent, or Firm* — Michael D. Ross; E. Joseph Gess; Susan M. Abernathy

(57) ABSTRACT

Disclosed is a method for preparing crystalline small pore molecular sieves, said method comprising (a) preparing a reaction mixture comprising (1) at least one active source of an oxide of a tetravalent element or mixture of tetravalent elements, (2) optionally at least on active source of an oxide of a trivalent element or mixture of trivalent elements, (3) at least one active source of an alkali metal, (4) seed crystals capable of forming the small pore molecular sieve, (5) a structure directing agent capable of forming the small pore molecular sieve, and (6) an amount of water that is not substantially in excess of the amount required to cause and maintain crystallization of the small pore molecular sieve; and (b) heating said reaction mixture at crystallization conditions for sufficient time to form crystallized material containing crystals of the small pore molecular sieve.

14 Claims, No Drawings

PREPARATION OF SMALL PORE MOLECULAR SIEVES

This application claims benefit under 35 USC 119 of Provisional Application 60/882,056, filed Dec. 27, 2006.

FIELD OF THE INVENTION

The present invention relates to a process for producing crystalline molecular sieves having small pores, such as molecular sieves having the CHA or AEI topology (including the molecular sieves designated SSZ-13 and SSZ-39), from a reaction mixture.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species.

Molecular sieves identified by the International Zeolite Associate (IZA) as having the structure code CHA are known. For example, the molecular sieve known as SSZ-13 is a known crystalline CHA material. It is disclosed in U.S. Pat. No. 4,544,538, issued Oct. 1, 1985 to Zones, which is incorporated by reference herein in its entirety. In U.S. Pat. No. 4,544,538, the SSZ-13 molecular sieve is prepared in the presence of N,N,N-trimethyl-1-adamantammoniumcation which serves as a structure directing agent ("SDA"), also known as on organic template.

Molecular sieves having the, IZA structure code AEI are also known, the zeolite known as SSZ-39 being an example. Zeolite SSZ-39 is disclosed in U.S. Pat. No. 5,958,370, issued Sep. 28, 1999 to Zones et al., which is incorporated herein by reference in its entirety.

U.S. Pat. No. 5,558,851, issued Sep. 24, 1996 to Miller, discloses a method for preparing a crystalline aluminosilicate zeolite from a reaction mixture containing only sufficient water so that the reaction mixture may be shaped if desired. In the method, the reaction mixture is heated at crystallization conditions and in the absence of an external liquid phase, so that excess liquid need not be removed from the crystallized material prior to drying the crystals. U.S. Pat. No. 5,558,851 is incorporated by reference herein in its entirety.

SUMMARY

Provided is a method for preparing a crystalline, small pore molecular sieve, said method comprising:
  a. preparing a reaction mixture comprising (1) at least one active source of an oxide of a tetravalent element or mixture of tetravalent elements, (2) optionally at least on active source of an oxide of a trivalent element or mixture of trivalent elements, (3) at least one active source of an alkali metal, (4) seed crystals capable of forming the small pore molecular sieve, (5) a structure directing agent capable of forming the small pore molecular sieve, and (6) an amount of water that is not substantially in excess of the amount required to cause and maintain crystallization of the small pore molecular sieve; and
  b. heating said reaction mixture at crystallization conditions for sufficient time to form a crystallized material containing crystals of the small pore molecular sieve, wherein said reaction mixture during crystallization has a water to (1) molar ratio between about 1 and about 5.

Also provided is a method for preparing shaped crystalline small pore molecular sieve, said method comprising:
  a. preparing a reaction mixture comprising (1) at least one active source of an oxide of a tetravalent element or mixture of tetravalent elements, (2) optionally at least on active source of an oxide of a trivalent element or mixture of trivalent elements, (3) at least one active source of an alkali metal, (4) seed crystals capable of forming the small pore molecular sieve, (5) a structure directing agent capable of forming the small pore molecular sieve, and (6) an amount of water that is not substantially in excess off the amount required to cause and maintain crystallization of the small pore molecular sieve;
  b. forming said reaction mixture into shaped particles; and
  c. heating said reaction mixture at crystallization conditions for sufficient time to form a crystallized material containing crystals of the small pore molecular sieve, wherein said, reaction mixture during crystallization has a water to (1) molar ratio between about 1 and about 5.

Also provided is a small pore molecular sieve, made by the process comprising;
  a. preparing a reaction mixture comprising (1) at least one active source of an oxide of a tetravalent element or mixture of tetravalent elements, (2) optionally at least on active source of an oxide of a trivalent element or mixture of trivalent elements, (3) at least, one active source of an alkali metal, (4) seed crystals capable of forming the small pore molecular sieve, (5) a structure directing agent capable of forming the small pore molecular sieve, and (6) an amount of water that is not substantially in excess of the amount required to cause and maintain crystallization of the small pore molecular sieve; and
  b. heating said reaction mixture at crystallization conditions for sufficient time to form a crystallized material containing crystals of the small pore molecular sieve, wherein said reaction mixture during crystallization has a, water to (1) molar ratio between about 1 and about 5.

DETAILED DESCRIPTION OF EMBODIMENTS OF THE INVENTION

The present invention relates to a method of preparing small pore molecular sieves. As used herein, the term "small pore molecular sieve" refers to molecular sieves having a pore size of less than 5 Angstroms. Examples of such small pore molecular sieves include those in which the pores have 8 membered rings ("8 MR"), such as those with the IZA structure code CHA and AEI. Specific examples of such molecular sieves include those known as SSZ-13 and SSZ-39. The small pore molecular sieves can have a mole ratio of (1) a tetravalent oxide or mixture of tetravalent oxides (e.g., silicon oxide, germanium oxide or mixtures thereof) to (2) a trivalent oxide or mixtures of trivalent oxides (e g., aluminum oxide, boron oxide, gallium oxide, iron oxide or mixtures thereof) in the molecular sieve framework of greater than 12, including mole ratios of 200 or more. For the sake of brevity, these molecular sieves having a molar ratio of oxide(s) (1) to oxide(s) (2) of greater than 12, including mole ratios of 200 or more, are referred to herein sometimes as "high silica" molecular sieves.

The reaction mixture from which and in which the small pore molecular sieve is crystallized comprises at least one active source of (1) a tetravalent oxide or mixture of tetravalent oxides (e.g., silicon oxide, germanium oxide or mixtures thereof and (2) at least one trivalent oxide or mixtures of trivalent oxides (e.g., aluminum oxide, boron oxide, gallium oxide, iron oxide or mixtures thereof), (3) at least one active source of an alkali metal (4) a structure directing agent ("SDA") capable of forming the small pore molecular sieve, (5) seed crystals capable of forming the small pore molecular sieve, and (6) an amount of water not substantially in excess of the amount required to cause and maintain crystallization of the small pore molecular sieve. As used herein, the term "not substantially in excess of the amount required to cause and maintain crystallization" means the minimum amount of water required is that which causes and maintains crystallization of the molecular sieve. This amount of water is considerably less than that required in conventional processes for preparing molecular sieves. While an amount slightly in excess of this minimum amount may be employed (especially if it is required to allow the reaction mixture to be thoroughly mixed and/or kneaded), the amount of water employed in the reaction mixture should not be so great that the reaction mixture turns into a solution or fluid gel.

Structure directing agents ("SDA") capable of forming the small pore molecular sieve include for example, 3-ethyl-1,3,8,8-tetramethyl-3-azoniabicyclo[3.2.1]octane cation, benzyl trimethylammonium hydroxide, N,N,N-trimethyl-1-adamantammonium cation, hexamethylene-1,6-bis-(N-methyl-'N-pyrrolidinium)dication, N,N,N-trimethyl-2-adamantanammonium cation, 4-methyl-2,3,6,7-tetrahydro-1H,5H-pyrido[3,2,1-ij]quinolinium cation, and N,N-diethyl-decahydroquinolinium cation.

The amount of liquid required in the reaction mixture of the present invention, where the liquid may include aqueous and organic liquids (e.g., the SDA), is that amount which is needed to adequately blend the mixture. Thus, a reaction mixture is prepared by mixing water with active sources of the high-silica, small pore molecular sieve to form a uniform mass can be, for example, in the form of a heavy paste-like consistency or in the form of a powder or granules. The active sources will be in a form which can be easily blended into a uniform mass, and may be, for example, powders, hydrated particles, or concentrated aqueous solutions. Sufficient water is added to wet all the starting material powders during mixing and/or kneading of the reaction mixture. Alternatively, sufficient water is added that the starting material powders may be kneaded into a uniform and generally homogeneous, self-supporting mixture. It is not necessary that all of the active sources be readily soluble in water during kneading, since the water added to the active sources will be insufficient to make a fluid-like mixture. The amount of water added depends on the mixing apparatus and on the active sources employed. Those familiar with the art can readily determine without undue experimentation the amount of liquid required to properly mix active sources of the molecular sieve. For example, hydrated sources of the molecular sieve may require relatively less water, and dried sources may require relatively more. Though it is preferred that the mixture be blended and/or kneaded until the mixture has a uniform, homogeneous appearance, the length of time devoted to kneading the mixture is not critical in the present invention.

The water content of the reaction mixture after blending and/or kneading may be further adjusted, for example by drying or by the addition of water so that the reaction mixture has the desired consistency.

In some embodiments it is important, in preparing the reaction mixture used to prepare the small pore molecular sieve, that the amount of water present in the reaction mixture as prepared for the crystallization step be sufficient to cause and maintain crystallization of the molecular sieve, but not so much that the water forms a liquid phase external to the react ion mixture, or transforms the reaction mixture into a solution or fluid gel. Conveniently, the reaction mixture will be in the form of granules, a powder or a self-supporting mass. While it is not a requirement to form the reaction mixture into shaped particles before the reaction mixture is subjected to crystallization conditions, it may be desired in many cases to do so. In this case, the amount of water used in the reaction mixture of this invention is less than the amount of water required in conventional processes for preparing molecular sieves. Thus, during the crystallization step according to the present process, there is no separate liquid phase present which must be removed from the crystallized material at the end of the crystallization step by, for example filtering or decanting, prior to drying the crystals. Also, the amount of water present in the reaction mixture is insufficient to cause the reaction mixture to collapse or "melt", i.e., once the reaction mixture is formed (including any adjustment in the liquid content that may be needed), the resulting mass is self-supporting. It is important to note that as used herein the term "self-supporting" (or any equivalent thereof) refers to a reaction mixture that does not collapse or "melt" under its own weight. This term includes the case where the reaction mixture is comprised of individual granules in which each granule is self-supporting or a powder in which each particle in the powder is self-supporting.

The solids content of the reaction mixture will depend on the particular composition of the small pore molecular sieve desired. Molecular sieves having a very high mole ratio of tetravalent oxide to trivalent oxide are within the scope of the process, including molecular sieves having a mole ratio of (1) tetravalent oxide (e.g., silicon oxide, germanium oxide or mixtures thereof) to (2) trivalent oxide (e.g., aluminum oxide, boron oxide, gallium oxide, iron oxide or mixtures thereof) of greater than 12, including molecular sieves having such a mole ratio of 200 and higher. Also included are small pore molecular sieves which are essentially trivalent oxide(s)-free (such as aluminum-free molecular sieves). In this case, the oxides in the molecular sieve are essentially all tetravalent oxide (e.g., all silicon oxide). Especially when commercial silica sources are used, aluminum is almost always present to a greater or lesser degree. Thus, by "aluminum-free" is meant that no aluminum is intentionally added to the reaction mixture, e.g., as an alumina or aluminate reagent, and that to the extent aluminum is present, it occurs only as a contaminant in the reagents.

Typical sources of silicon oxide ($SiO_2$) include silicates, silica hydrogel, silicic acid, colloidal silica, fumed silica, tetraalkyl orthosilicates silica hydroxides, precipitated silica and clays. Typical sources of aluminum oxide ($Al_2O_3$) when used in the reaction mixture include aluminates, alumina, and aluminum compounds such as $AlCl_3$, $Al_2(SO_4)_3$, aluminum hydroxide ($Al(OH)_3$), kaolin clays, and zeolites. Germanium, boron, gallium and iron can be added in forms corresponding to their aluminum and silicon counterparts. Salts, particularly alkali metal halides such as sodium chloride, can be added to or formed in the reaction mixture. They are disclosed in the literature as aiding the crystallization of molecular sieves while preventing silica occlusion in the lattice.

The reaction mixture also comprises one or more active sources of alkali metal oxide. Sources of lithium, sodium and potassium, are conveniently employed with sodium being a typical alkali metal. Any alkali metal compound which is not detrimental to the crystallization process is suitable. Non-limiting examples include alkali metal oxides, hydroxides, nitrates, sulfates, halogenides, oxalates, citrates and acetates.

In one embodiment of the present invention, depending on the consistency of the reaction mixture, it may be able to form the reaction mixture into a desired, self-supporting shape before the crystallization step (referred to herein as the "preforming step"), thereby reducing the number of process steps required to prepare catalytic materials containing the molecular sieve prepared in the mixture. Prior to forming the reaction mixture, it may be necessary to change the liquid content of the reaction mixture, either by drying or by adding more liquid, in order to provide a formable mass which retains its shape. In general for most shaping methods, water will generally comprise from about 20 percent to about 60 percent by weight, and preferably from about 30 percent to about 50 percent by weight of the reaction mixture.

In the preforming step, the reaction mixture can be formed into shaped particles. Methods for preparing the particles are well known in the art, and include, for example, extrusion, spray drying, granulation, agglomerization and the like. The particles are preferably of a size and shape desired for the ultimate catalyst, and may be in the form of, for example, extrudates, spheres, granules, agglomerates and prills. The particles will generally have a cross sectional diameter between about 1/64 inch and about 1/2 inch, and preferably between about 1/32 inch and about 1/4 inch, i.e. the particles will be of a size to be retained on a 1/64 inch, and preferably on a 1/32 inch screen and will pass through a 1/2 inch, and preferably through a 1/4 inch screen.

In one embodiment, the shaped particles prepared from the reaction mixture will contain sufficient water to retain a desired shape. Additional water is not required in the mixture in order to initiate or maintain crystallization within the shaped particle. Indeed, it may be preferable to remove some of the excess water from the shaped particles prior to crystallization. Convention methods for drying wet solids can be used to dry the shaped particles, and may include, for example drying in air or an inert gas such as nitrogen or helium at temperatures below about 200° C. and at pressures from subatmospheric to about 5 atmospheres pressure.

Naturally occurring clays, e.g., bentonite, kaolin, montmorillonite, sepiolite and attapulgite, are rot required, but may be included in the shaped particles prior to crystallization to provide particles having good crush strength. Such clays can be used in the raw state as originally mined or can be initially subjected to calcination, acid treatment or chemical modification. Microcrystalline cellulose has also been found to improve the physical properties of the particles.

According to the present process, small pore molecular sieves are crystallized either within the reaction mixture or within the shaped particles made from the reaction mixture. In either case, the composition of the mixture from which the molecular sieves are crystallized has the following molar composition ranges:

| Composition | Molar Range | Example Embodiment |
|---|---|---|
| $YO_2/W_2O_3$ | 20-∞ | 20-100 |
| $M^+/YO_2$ | 0.1-0.4 | 0.2-0.4 |
| $R/YO_2$ | 0.001-0.4 | 0.01-0.3 |
| $OH^-/YO_2$ | 0.2-0.6 | 0.4-0.6 |
| $H_2O/YO_2$ | 1-5 | 2-4 | where Y is silicon, germanium or both, W is aluminum, boron, gallium, iron, or a mixture thereof, M+ is an alkali metal ion, preferably sodium, and R is an SDA capable of forming the small pore molecular sieve.

As stated above, the liquid present in the reaction mixture (which may be in the form of shaped particles) may be a combination of aqueous and organic liquids, so long as the amount of water present is, sufficient to cause and maintain crystallization of the small pore molecular sieve, while at the same time optionally keeping the reaction mixture self-supporting. Since the total liquid content may affect, for example, the physical strength of any shaped particles made from the reaction mixture, it is preferred that the total volatiles content of the reaction mixture during crystallization be in the range of between about 20% and about 60% (w/w), and preferably between about 30% and about 60% (w/w), where the total volatiles content is the measure of total volatile liquid, including water, in the reaction mixture. It is a feature of the present process that no additional liquid beyond that required to cause and maintain crystallization of the small pore molecular sieve is required for crystallization of the small pore molecular sieve within the reaction mixture.

In one embodiment, crystallization of the molecular sieve takes place in the absence of an external liquid phase, i.e., in the absence of a liquid phase separate from the reaction mixture. In general, it is not detrimental to the present process if some liquid water is present in contact with the reaction mixture or with the shaped particles during crystallization, and it can be expected that some water may appear on the surface of the reaction mixture, such as in the form of beads, during crystallization. However, it is an objective of the present invention to provide a method of crystallizing, high-silica, small pore molecular sieves in such a way as to minimize the amount of water which must be treated and/or discarded following crystallization. To that end, the present method provides a method of synthesizing small pore molecular sieves which requires no additional water for crystallization beyond a sufficient amount of water required to, cause and maintain crystallization of the small pore molecular sieve, while at the same time optionally keeping the reaction mixture self-supporting. Indeed, under certain conditions, liquid water present during crystallization may alter the form of the reaction mixture or shaped particles, and, in extreme circumstances, may cause the reaction mixture or shaped particles to lose their integrity or to dissolve.

Crystallization is conducted at an elevated temperature and usually in an autoclave so that the reaction mixture is subject to autogenous pressure until the small pore molecular sieve crystals are formed. The temperatures during the hydrothermal crystallization step are typically maintained from about 140° C. to about 200° C.

It is an important feature of the present process that the crystallization of the small pore molecular sieve is frequently accelerated relative to conventional crystallization methods. Thus, the crystallization time required to form crystals will typically range from about 1 hour to about 10 days, and more frequently from about 3 hours to about 4 days.

The small pore molecular sieve is crystallized within the reaction mixture, which comprises amorphous, non-crystalline reagents. Crystals of a molecular sieve capable of forming the small pore molecular sieve (i.e., "seed" crystals) are added to the mixture prior to the crystallization step, and methods for enhancing the crystallization of molecular sieves by adding "seed" crystals are well known. Conveniently, the seed crystals are crystals of the desired small pore molecular sieve (such as crystals of SSZ-13 when that is the desired molecular sieve). The seed crystals of are employed in amounts from about 1 to about 10 wt. % of the weight of silicon oxide (calculated from the amount of active silica source) in the reaction mixture.

Once the molecular sieve crystals have formed, the crystals may be water-washed and then dried, e.g., at 90° C. to 150° C. for from 8 to 24 hours. The drying step can be performed at atmospheric or subatmospheric pressures.

The small pore molecular sieve may be used in catalysts (such as for converting methanol to light olefins such as ethylene and propylene), in separations (such as in mixed matrix membranes for separating $CO_2$ from methane), and in environmental applications (such as adsorption of CO and light hydrocarbons). When shaped particles are formed from the reaction mixture described hereinbefore, they may be of a size and shape desired for the use to which the small pore molecular sieve will be put. Alternatively, the small pore molecular sieve can be composited with other materials resistant to the temperatures and other conditions using techniques such as spray drying, extrusion, and the like.

The following examples illustrate the present invention with respect to the molecular sieve known as SSZ-13. However, other small pore molecular sieves, including those having the CHA or AEI topology can be made in a similar manner. The following examples demonstrate, but do not limit, the present invention.

EXAMPLE 1

Twenty grams of Hi-Sil 233 (source of silicon oxide) was placed in a suitable vessel. Reheis F-2000 alumina (1.7 grams) was dissolved in 5 grams of a 50% aqueous NaOH solution and then added to the Hi-Sil 233 in the vessel. The resulting mixture is mixed thoroughly. To the resulting mixture was added 1 gram of SSZ-13 seed crystals, and the mixture thoroughly mixed again for 5 minutes. 23.3 Grams of a 2.36 mmole/gram solution of benzyl trimethylammonium hydroxide was added slowly to the mixture while mixing 8 Grams of D.I. water was added slowly and the resulting mixture mixed thoroughly for 1 hour. The resulting mixture was in the form of slightly wet granules with a volatiles content of 59.6%.

The molar composition of the synthesis mix was:

| | |
|---|---|
| $SiO_2/Al_2O_3$ | 35 |
| $Na^+/SiO_2$ | 0.21 |
| $R/SiO_2$ | 0.18 |
| $OH^-/SiO_2$ | 0.39 |
| $H_2O/SiO_2$ | 4.8 |

The resulting reaction mixture was divided into two parts (parts A and B), each part was placed in separate 3.5 inch pipe autoclaves and crystallized at 160° C. for 2 days (for Part A) and 4 days (for part B).

The products were washed with pH 12.5 water twice, then once with plain D.I. water. The products were filtered and dried in a vacuum oven at 120° C. overnight, then calcined at 1100° F. for 6 hours.

The resulting products were SSZ-13.

EXAMPLE 2

Twenty grams of Hi-Sil 233 (source of silicon oxide) was placed in a suitable vessel. Reheis F-2000 alumina (1.7 grams) was dissolved in 7.9 grams of a 50% aqueous NaOH solution and then added to the Hi-Sil 233 in the vessel. The resulting mixture is mixed thoroughly. To the resulting mixture was added 1 gram of SSZ-13 seed crystals, and the mixture thoroughly mixed again for 5 minutes. 23.3 Grams of a 2.36 mmole/gram solution of benzyl trimethylammonium hydroxide was added slowly to the mixture while mixing. 8 Grams of D.I. water was added slowly and the resulting mixture mixed thoroughly for 1 hour. The resulting mixture was in the form of slightly wet granules with a volatiles content of 61%.

The molar composition of the synthesis mix was:

| | |
|---|---|
| $SiO_2/Al_2O_3$ | 35 |
| $Na^+/SiO_2$ | 0.33 |
| $R/SiO_2$ | 0.18 |
| $OH^-/SiO_2$ | 0.51 |
| $H_2O/SiO_2$ | 5.2 |

The resulting reaction mixture was placed in a 3.5 inch pipe autoclave and crystallized at 170° C. for 2 days.

The product was washed with pH 11 water twice, then once with plain D.I. water. The product was filtered and dried in a vacuum oven at 120° C. overnight, then calcined at 1100° F. for 6 hours.

The resulting product was SSZ-13.

EXAMPLE 3

Twenty grams of Hi-Sil 233 (source of silicon oxide) was placed in a suitable vessel. 1.2 grams of Barcroft 250 alumina (52% Al2O3) was dissolved in 7.9 grams of a 50% aqueous NaOH solution and then added to the Hi-Sil 233 in the vessel. The resulting mixture is mixed thoroughly. To the resulting mixture was added 1 gram of SSZ-13 seed crystals, and the mixture thoroughly mixed again for 5 minutes. 23.3 Grams of a 2.36 mmole/gram solution of benzyl trimethylammonium hydroxide was added slowly to the mixture while mixing 6 Grams of D.I. water was added slowly and the resulting mixture mixed thoroughly for 1 hour. The resulting mixture was in the form of slightly wet granules with a volatiles content of 60%.

The molar composition of the synthesis mix was:

| | |
|---|---|
| $SiO_2/Al_2O_3$ | 50 |
| $Na^+/SiO_2$ | 0.33 |
| $R/SiO_2$ | 0.18 |
| $OH^-/SiO_2$ | 0.51 |
| $H_2O/SiO_2$ | 5.0 |

The resulting reaction mixture was placed in a 3.5 inch pipe autoclave and crystallized at 170° C. for 2 days.

The product was washed with pH 11 water twice, then once with plain D.I. water. The product was filtered and dried in a vacuum oven at 120° C. overnight, then calcined at 1100° F. for 6 hours.

The resulting product was SSZ-13.

For the purposes of this specification and appended claims, unless otherwise indicated, all numbers expressing quantities percentages or proportions, and other numerical values used in the specification and claims, are to be understood as being modified in all instances by the term "about." Furthermore, all ranges disclosed herein are inclusive of the endpoints and are independently combinable.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims.

What is claimed is:

1. A method for preparing a crystalline small pore molecular sieve, said method comprising:
   a. preparing a reaction mixture comprising dissolving alumina in an aqueous solution containing an active alkali metal source; and combining the solution with (1) at least one active source of an oxide of a tetravalent element or mixture of tetravalent elements, (2) seed crystals capable of forming the small pore molecular sieve, (3) a structure directing agent capable of forming the small pore molecular sieve, and (4) an amount of water that is not substantially in excess of the amount required to cause and maintain crystallization of the small pore molecular sieve; and
   b. heating said reaction mixture at crystallization conditions for sufficient time to form a crystallized material containing crystals of the small pore molecular sieve, wherein said reaction mixture during crystallization has a water to (1) molar ratio between about 1 and about 5.

2. The method of claim 1, wherein said reaction mixture during crystallization has a water to (1) molar ratio of about 5.

3. The method of claim 1, wherein the heating said reaction mixture at crystallization conditions is done in the absence of an external liquid phase.

4. The method of claim 3 wherein the mole ratio of oxides in the small pore molecular sieve formed from (1) and (2) is 200 or more.

5. The method of claim 1 wherein the mole ratio of the oxides in the small pore molecular sieve formed from (1) and (2) is greater than 12.

6. The method of claim 1 wherein the pore size of the small pore molecular sieve is less than 5 Angstroms.

7. The method according to claim 1 wherein said reaction mixture has the following, molar composition ranges:

| | |
|---|---|
| $YO_2/W_2O_3$ | 20-∞ |
| $M^+/YO_2$ | 0.1-0.4 |
| $R/YO_2$ | 0.001-0.4 |
| $OH^-/YO_2$ | 0.2-0.6 |
| $H_2O/YO_2$ | 1-5 | where Y is silicon, germanium or mixtures thereof, W is aluminum, boron, gallium, iron, or a mixture thereof, $M^+$ is an alkali metal ion and R is a structure directing agent capable of forming the small pore molecular sieve.

8. A method for preparing a shaped crystalline small pore molecular sieve, said method comprising:
   a. preparing a reaction mixture comprising dissolving alumina in an aqueous solution containing an active alkali metal source; and combining the solution with (1) at least one active source of an oxide of a tetravalent element or mixture of tetravalent elements, (2) seed crystals capable of forming the small pore molecular sieve, (3) a structure directing agent capable of forming the small pore molecular sieve, and (4) an amount of water that is not substantially in excess of the amount required to cause and maintain crystallization of the small pore molecular sieve;
   b. forming said reaction mixture into shaped particles; and
   c. heating said reaction mixture at crystallization conditions and in the absence of an external liquid phase for sufficient time to form a crystallized material containing crystals of the small pore molecular sieve, wherein shaped particles during crystallization have a, water to (1) mole ratio between about 1 and about 5.

9. The method of claim 8 wherein said shaped particles during crystallization have a water to (1) mole ratio of about 5.

10. The method of claim 8, wherein the heating said reaction mixture at crystallization conditions is done in the absence of an external liquid phase.

11. The method of claim 8, wherein the mole ratio of the oxides in the small pore molecular sieve formed from (1) and (2) is greater than 12.

12. The method of claim 11, wherein the mole ratio of oxides in the small pore molecular sieve formed from (1) and (2) is 200 or more.

13. The method of claim 8, wherein the pore size of the small pore molecular sieve is less than 5 Angstroms.

14. The method according to claim 8 wherein said reaction mixture has the following molar composition ranges:

| | |
|---|---|
| $YO_2/W_2O_3$ | 20-∞ |
| $M^+/YO_2$ | 0.1-0.4 |
| $R/YO_2$ | 0.001-0.4 |
| $OH^-/YO_2$ | 0.2-0.6 |
| $H_2O/YO_2$ | 1-5 | where Y is silicon, germanium or mixtures thereof, W is aluminum, boron, gallium, iron, or a mixture thereof $M^+$ is an alkali metal ion and R is a structure directing agent capable of forming the small pore molecular sieve.

* * * * *